United States Patent
Peery et al.

(10) Patent No.: US 6,230,264 B1
(45) Date of Patent: *May 8, 2001

(54) PARAMETERLESS LANGUAGE IN A MACHINE FOR IMPLEMENTATION THEREOF

(75) Inventors: Kenieth Robert Peery, Bellevue; Timothy David Corrie, Jr.; Sanjay D. Jejurikar, both of Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/386,530

(22) Filed: Aug. 30, 1999

Related U.S. Application Data

(63) Continuation of application No. 08/852,186, filed on May 6, 1997, now Pat. No. 5,987,602.

(51) Int. Cl.[7] .................................................. G06F 15/00
(52) U.S. Cl. .............................. 712/245; 712/247; 712/2
(58) Field of Search .................................. 712/245, 246, 712/247, 208, 32, 248; 717/1

(56) References Cited

U.S. PATENT DOCUMENTS

| | | | |
|---|---|---|---|
| 3,875,564 | 4/1975 | Thuruoka et al. | 340/172.5 |
| 4,901,235 | 2/1990 | Vora et al. | 364/200 |
| 5,034,879 | 7/1991 | Woodward et al. | 364/200 |
| 5,241,637 | 8/1993 | Skruhak et al. | 395/375 |
| 5,530,889 | 6/1996 | Kametani | 395/800 |
| 5,987,602 | * 11/1999 | Peery et al. | 712/245 |

* cited by examiner

Primary Examiner—Larry D. Donaghue
(74) Attorney, Agent, or Firm—Lee & Hayes, PLLC

(57) ABSTRACT

A non-traditional computing machine having no operands and no linear addressing of code or data is disclosed. A code space having multiple dimensions contains programmed instructions each having a unique position defined with respect to the code space dimensions. A data space having multiple dimensions contains data bits each having a unique position defined with respect to the data space dimensions. A code pointer has a position and a direction within the code space. The code pointer position identifies a present instruction. A data pointer has a position and a direction within the data space. The data pointer position identifies a present data bit. The programmed instructions are selected from an instruction set that includes instructions for navigating the code pointer to select instructions and navigating the data pointer to select data bits. The computing machine operates to manipulate the data in the data space according the programmed instructions.

8 Claims, 5 Drawing Sheets

FIG. 3

| | CODE POINTER | DATA POINTER | APPLY INSTRUCTION |
|---|---|---|---|
| 301 | 107/101:D | 206/204:R | RD |
| 302 | 108/101:D | 206/204:U | RD |
| 303 | 109/101:D | 206/204:L | RD |
| 304 | 110/101:D | 206/204:D | INC |
| 305 | 111/101:D | 207/204:D | RD |
| 306 | 112/101:D | 207/204:R | SKP |
| 307 | 114/101:D | 207/204:R | SKP |
| 308 | 116/101:D | 207/204:R (1) | SZ |
| 309 | 117/101:D | 207/204:R | RC |
| 310 | 117/102:R | 207/204:R | RC |
| 311 | 116/102:U | 207/204:R | INC |
| 312 | 115/102:U | 207/205:R | RC |
| 313 | 115/101:L | 207/205:R | RC |
| 314 | 116/101:D | 207/205:R (0) | SZ |
| 315 | 118/101:D | 207/205:R | SKP |
| 316 | 120/101:D | 207/205:R | RD |
| 317 | 121/101:D | 207/205:U | INC |
| 318 | 122/101:D | 206/205:U | RD |
| 319 | 123/101:D | 206/205:L | INC |
| 320 | 124/101:D | 206/204:L (0) | INV |
| 321 | 125/101:D | 206/204:L* (1) | |

FIG. 7

| | 701 | 702 |
|---|---|---|
| 703 | 000X | INC |
| 704 | 001X | RD |
| 705 | 010X | RC |
| 706 | 011X | INV |
| 707 | 100X | SKP |
| 708 | 1010 | SZT |
| 709 | 1011 | SZF |

(Table 700)

PARAMETERLESS LANGUAGE IN A MACHINE FOR IMPLEMENTATION THEREOF

RELATED APPLICATIONS

This is a continuation of U.S. patent application Ser. No. 08/852,186, filed May 6, 1997, which issued as U.S. Pat. No. 5,987,602, on Nov. 16, 1999.

FIELD OF THE INVENTION

This invention relates to the field of programmable computers. In particular, this invention relates to a reduced instruction set computing machine and language in which there is no need for classical linear addressing and no need for operand decoding.

PROBLEM

Most of today's commercial computing devices and programming languages are built upon the foundation of the von Neumann Machine. The von Neumann Machine, named after mathematician John von Neumann, defines a class or an architecture for electrical computing devices. The von Neumann Machine solves algorithmically defined problems by repeatedly performing a cycle of operations. Each computer built according to this architecture has an instruction set which defines the available operational codes ("opcodes") for a given programming language and system.

The von Neumann Machine is generally characterized by a Central Processing Unit ("CPU") containing an Arithmetic Logic Unit ("ALU"), and a memory. In general terms, the machine operates by repeating a cycle of events. First, an instruction is fetched from memory. Each instruction includes both an opcode and an operand. The opcode is an instruction to the CPU directing a certain operation be performed. The operand is the data on which the ALU operates. The operand may be the data itself or it may provide an address from which the data can be retrieved. After fetching an instruction, the CPU fetches the necessary data from memory. Then the CPU, specifically the ALU, executes the opcode on the data. The results of the operation are stored in memory and operation of the machine then returns to the first step to fetch the next instruction. This has been the model underlying electronic computers for more than 50 years.

Modern computers developed up until the mid-1980's are commonly called Complex Instruction Set Computing ("CISC") machines. CISC machines have relatively large instruction sets including complex, multi-cycle instructions. A large, complex instruction set allows for the development of relatively compact code as each single instruction can actually represent multiple operations by the CPU. The compactness of the code or program was particularly important during this period because of the high cost memory. The downside to the compact code of CISC machines, however, is that significant processing time is consumed by the decoding of these complex instructions. The term "decoding" refers to the process carried out by the CPU of reading or parsing each instruction and converting each instruction into language that can be utilized at the hardware level of the machine to perform the requested operations. It is the "microcode" of a CISC machine that effectively translates between a human-readable instruction and an instruction executable by the electronic hardware. Also part of the decoding process is operand decoding which involves the identification, location and retrieval of the data to be operated on by the instruction. Complex decoding takes processing time and limits the performance available with CISC machines.

Beginning in the mid-1980's, corporate and university researchers began developing Reduced Instruction Set Computing ("RISC") machines and methodologies. Researchers found that the vast majority of the operations performed by a CPU could be covered by a relatively small set of instructions. RISC computers were developed to optimize the operation of that small instruction set by hard-wiring those frequently used operations in the hardware. More complex operations were, unlike with CISC computers, simulated in software instead of being wired into the CPU itself. The code resulting from the use of a smaller instruction set is less compact than that of a CISC machine but is processed much more quickly than the equivalent code in a CISC machine. Less compact code is less of a problem for the design of modern computers as the cost of memory has been reduced dramatically and continues to fall.

The basic operation of a RISC computer is the same as a CISC computer. An instruction is fetched from memory and decoded. Each instruction includes an opcode and an operand. The instructions in a RISC computer are typically of a fixed length. Each instruction is typically one word long whereas in a CISC computer the instruction length might be one word or it might be two, three or more words. Other RISC characteristics including more structured and efficient memory access, pipe-lined execution and the lack of microcode contribute to an increased processing speed for RISC machines as compared to CISC machines.

Even the most powerful RISC computers, however, are limited by the requirements of linear addressing and operand decoding. A program of an existing computer operates through the successive execution of each line or step in the program. At the completion of each step, the program execution continues to the next step. The current location in the program is determined by a program counter that, in effect, successively counts through the memory locations in which the program is stored. A decision step in the program can cause the program counter to jump to a different location or address in the program memory. Once the step at the new location is executed, the program counter again continues its successive incrementing through the steps of the program. Just as each program step is stored at an addressed memory location, so is each piece of data individually addressed. The CPU of current computers only executes operations on data that is in memory or registers accessible to the CPU. The data must be retrieved from memory and stored in a register so that the CPU can utilize the data in the execution of an instruction. Every time a CISC or RISC machine decodes an instruction's operand, the operand must be translated to a memory location, the memory location must be located, and the data residing at that memory location must be copied to a register. The CPU is then able to execute the opcode on the data copied in a register. Each of the above steps consumes processing cycles or "CPU time".

There exists a need for a computer with no need for addressing in the linear sense described with respect to existing computers. There exists a further need for a computer with no need for operand decoding. There is a further need for a computer that does not require the loading of data from memory to CPU registers or the storing of data from CPU registers to memory.

SOLUTION

The above identified problems, and others, are solved and a technical advance achieved in the field, by the parameterless language and machine for implementation thereof of the present invention. The present invention provides a programming language and apparatus for optimally implementing the language which utilizes a multiply dimensioned code space and a multiply dimensioned data space to create a "parameterless computer". The parameterless computer of the present invention has no need for addressing and no need for operand decoding as all operands are implicit. There is no data loading from memory or data storing to memory as the data is operated on in the data space where it resides. The state of the computer is defined not only by the data and the code but also by the direction of a code pointer and a data pointer. The result is a computing environment where instruction execution speed approaches or equals clock speed.

A parameterless computer of the present invention includes a code space and a data space. A code space contains the instructions for operating the parameterless computer of the present invention. The data space contains the data of a parameterless computer of the present invention. The code space may be separate from the data space or may be common with the data space. A code pointer is defined by both a position and a direction within the code space. The code pointer navigates through the code space according to the instructions encountered by the code pointer in the code space. A data pointer is defined by both a position and a direction within the data space. The data pointer navigates through the data space according to the executed instructions and the state of the data in the data space. The state of the parameterless computer at any given time is determined by the position and direction of the code pointer within the code space and the position and direction of the data pointer within the data space.

The code space and the data space are characterized by two measures. One is the dimension of the space. A code or data space can be n-dimensional. The other characteristic used to describe the code and data space is the type of tiling where the instructions or the data are stored one per tile. The combination of the dimensions and tiling of a space (code or data) determines the specific instructions necessary to navigate the code and data pointers. For example, in a three-dimensional code space using cubic tiles, each cube, i.e., each instruction in the code space, can be accessed from six different directions. Therefore, the instruction set includes instructions for moving the code pointer through the code space in any of six different directions. Alternatively, a three-dimensional code space might be populated with pyramidal polyhedron tiles. Assuming four-sided pyramidal polyhedrons, each instruction in the code space can be accessed from four different directions. Therefore the instruction set for this example includes instructions for moving the code pointer through the code space in any of the four different directions. The data space and the code space are both described in terms of dimensions and tiling.

The dimensions and tiling also determines the number of bits making up an instruction word in code space. The instruction word bit length is determined by counting the number of vertices in the tile shape of a given space. Two-dimensional, square tiles have four vertices and therefore are populated by 4 bit words. Three dimensional, cubic tiles have 8 vertices and therefore are populated by 8 bit words.

The instruction set of the parameterless computer of the present invention includes instructions for navigating the code and data pointers within their respective spaces. The instruction set also provides instructions for altering the flow of the code pointer based on the state of the data bit presently identified by the data pointer. Finally, the instruction set provides an instruction for inverting the state of the data bit presently identified by the data pointer.

The data in the parameterless computer is utilized and modified in the data space where the data is stored. Rather than retrieving a piece of data from memory on which to execute an instruction, the data bit at the current location of the data pointer is the only data bit amenable to modification. The data is not identified by an addressed location in memory. Each bit is individually accessed by navigating the data pointer to the position of an individual bit. Likewise, each instruction or piece of code in the parameterless computer is not identified by an addressed location in memory.

Code is arranged to optimize its reusability in the parameterless computer of the present invention. In a two-dimensional code space with square tiling, each instruction can be approached by a code pointer moving in any of the four directions possible in a two-dimensional, square tiled space. This means that a single instruction or group of instructions can be used in different directions of code execution to produce different results. Code can be reused as in the traditional sense of a loop of code execution or code can be reused in an entirely unrelated fashion. The small instruction set of the parameterless computer of the present invention increases the probability of reusing code. Code reuse is particularly advantageous and possible since there are no operands associated with the instructions to limit the reuse of code.

The present invention provides a parameterless computer in which there are no operands and therefore no need for operand decoding. The parameterless computer utilizes no linear addressing as used by existing computers. Also, there is no need to copy or load data from memory to registers as each data bit is used and manipulated where it is stored in the data space. The result is a computer with a dramatically reduced instruction set where the instruction execution speed approaches or equals the system clock speed.

BRIEF DESCRIPTION OF THE DRAWINGS

FIG. 3 is a data pointer and code pointer summary for a partial execution of the code of FIG. 1.

FIG. 7 is a table illustrating data bytes corresponding to instructions of the parameterless language of the present invention.

DETAILED DESCRIPTION

Figure 1:
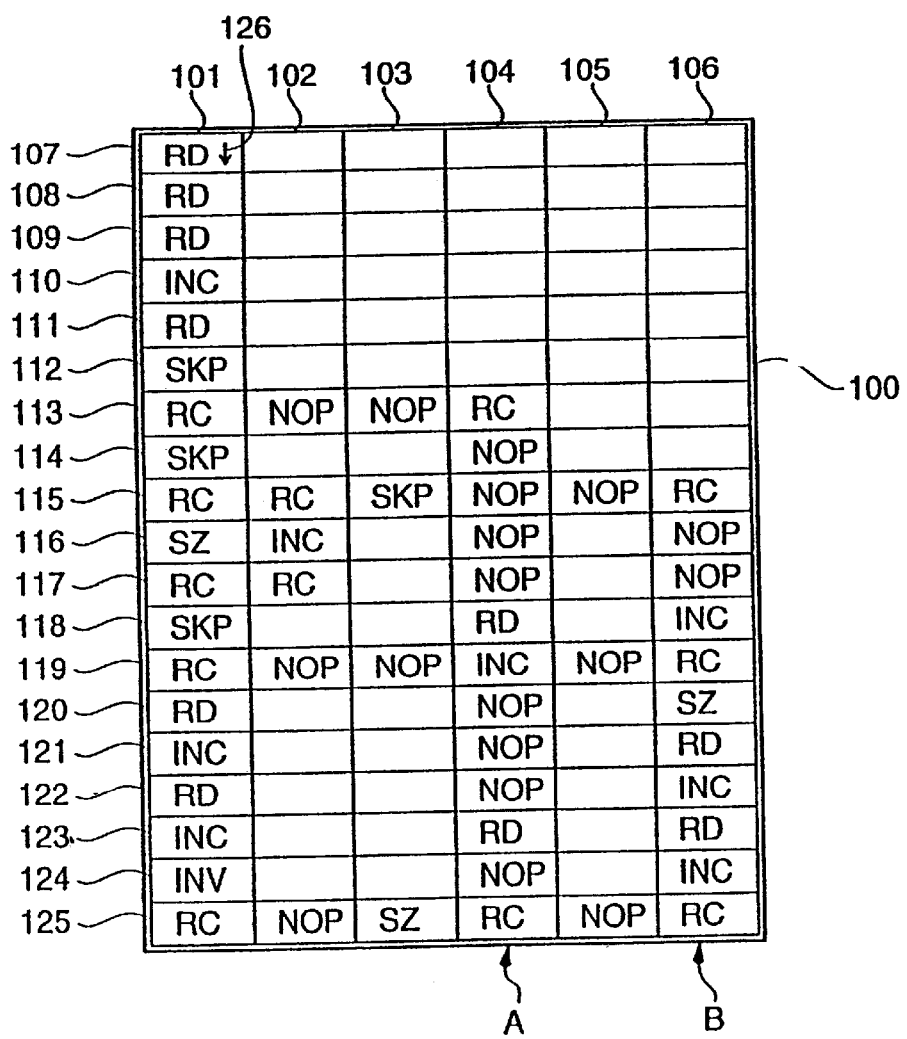
FIG. 1 is an exemplary code space according to the language of the present invention
Figure 2:
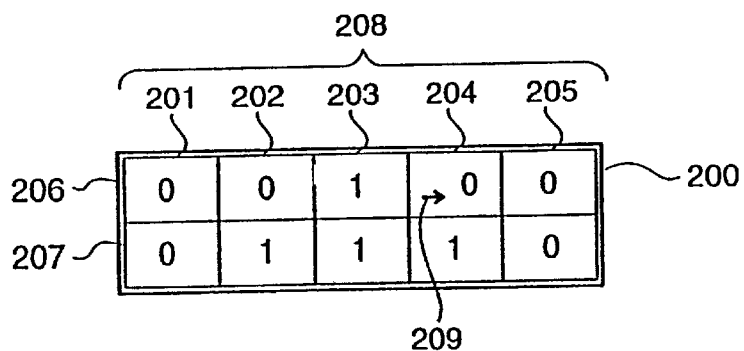
FIG. 2 is an exemplary data space according to the language of the present invention.
Figure 4:
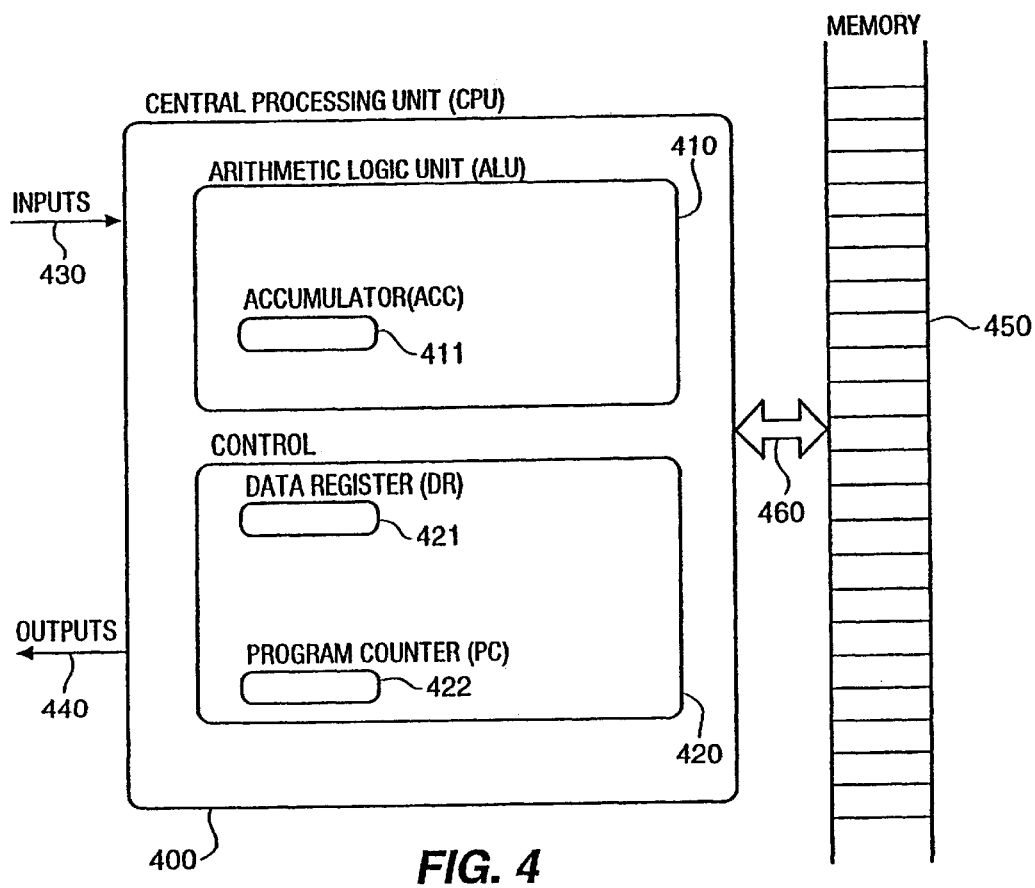
FIG. 4 is a block diagram of a prior art computer.

The general operation of existing computers is first described with respect to FIG. 4. The structure and operation of the parameterless computer of the present invention is described in general with respect to FIG. 5. The general methods of operation of the parameterless language of the present invention are described with respect to FIG. 8. An exemplary parameterless computer program is described with respect to FIGS. 1–3. An exemplary parameterless computer for implementing the program described with respect to FIGS. 1–3 is described with respect to FIGS. 6–7.

Current Computing—FIG. 4 (Prior Art)

FIG. 4 illustrates a block diagram of a present computer architecture. Central Processing Unit ("CPU") 400 is comprised of Arithmetic Logic Unit ("ALU") 410 and control 420. Inputs are received by CPU 400 over path 430 and outputs are generated by CPU 400 over path 440. Data is exchanged between CPU 400 and memory 450 over bus 460. Each location in memory 450 has two numbers associated with it. One number is the address of the memory location and the other number is the actual data stored at the memory location. Data stored in memory 450 is not directly accessible by ALU 410 but rather must be moved from memory 450 by the operation of control 420. After the necessary instruction decoding, data is copied from memory 450 to data register 421. Program counter 422 increments with each executed step of a program to keep track of the next instruction to be executed. If appropriate, the contents of data register 421 are loaded from data register 421 to accumulator 411 of ALU 410. ALU 410 can only operate on data that is loaded into accumulator 411 or other registers (not shown) of ALU 410. The data stored in memory 450 is not accessible to CPU 400 until it is copied from memory 450 over bus 460 to a register that can be read by CPU 400.

Each executed instruction requires that the appropriate instruction be retrieved from memory 450, according to the contents of program counter 422. The current instruction must be parsed into opcode and operand. The appropriate piece of data then must be retrieved from memory 450 into data register 421 and loaded from data register 421 into accumulator 411 of ALU 410. Finally, ALU 410 is able to execute the current instruction on the contents of accumulator 411.

Figure 5:
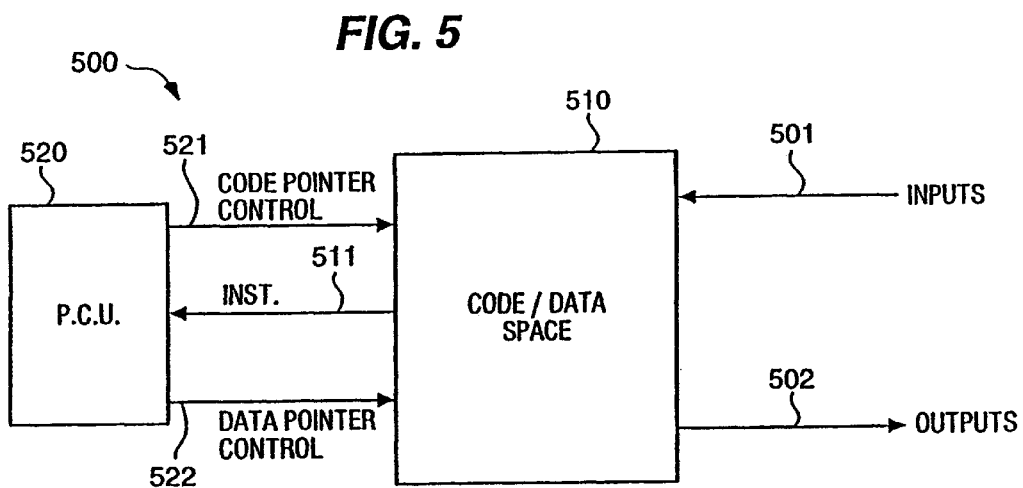
FIG. 5 is a block diagram of a parameterless computer of the present invention.

Parameterless Computer Structure and Operation in General—FIG. 5

FIG. 5 is a block diagram of a parameterless computer 500 for implementation of the parameterless programming language of the present invention. Computer 500 is comprised of code/data space 510 and Pointer Control Unit ("PCU") 520. Inputs to code/data space 510 are made over path 501 and outputs from code/data space 510 are provided over path 502. Each instruction causes the generation of a signal from code/data space 510 through path 511 to PCU 520. PCU 520 operates to select instructions in code/data space 510 for execution. PCU 520 operates to select data bits in code/data space 510 for program control and data manipulation or amendment. PCU 520 also determines what action to perform responsive to the current instruction. There are two primary categories of actions directed by PCU 520 in the execution of each instruction. One category of action involves the navigation of a code pointer (not shown) in code/data space 510. The term "code pointer" does not refer to a physical device or event. Rather, to say the code pointer has a certain status or is at a certain position is to define the current state of the program execution including the next instruction to be executed. The code pointer is defined, at any given time, by a position and a direction within code/data space 510. The code pointer position and direction is controlled by information passed through path 521 from PCU 520 to code/data space 510.

The other primary category of actions directed by PCU 520 involves navigation of a data pointer (not shown). The term "data pointer" does not refer to a physical device or event. Rather, to say the data pointer has a certain status or is at a certain position is to identify an individual data bit in the data space as well as to identify a second data bit that will be accessed when the data pointer is next moved or incremented. The data pointer is defined, at any given time, by a position and a direction within code/data space 510. The data pointer position and direction is controlled by information passed through path 522 from PCU 520 to code/data space 510. In addition to providing information over path 522 to navigate the data pointer through code/data space 510, PCU 520 operates through signals communicated over path 522 to invert, as appropriate, the current data bit identified by the data pointer.

In the parameterless language and machine of the present invention, data is not copied from code/data space 510. The data is operated on and utilized where it resides in code/data space 510. All data operations of the parameterless computer of the present invention are accomplished through the navigation of the data pointer through the data space to individual data bits which, when identified by the data pointer, may be inverted and/or used for further program control.

Instruction Set and Pointer Operation—Table 1

A two-dimensional, square tiled parameterless computer is the simplest example of the methods and apparatus of the present invention. The fundamental principles of the present invention, once understood with respect to a two-dimensional, square tiled parameterless computer, are easily applied to a parameterless computer of "n"-dimensions and any shaped tiling. The present invention includes both a programming language and a physical implementation which are complementary in design. For purposes of clarity, the programming language component of the present invention is first described apart from any physical implementation. As with existing computers, once the instruction set and general concepts of operation are understood, there are any number of physical implementations that can be used to implement a particular application of the parameterless computer of the present invention. An exemplary physical implementation or hardware set is discussed below with respect to FIGS. 1–3, 6.

The two-dimensional, square tiled parameterless computer of this example comprises a two-dimensional, square tiled code space and a two-dimensional, square tiled data space. The extent to which the code space and data space are common or separate is important when a physical implementation of the parameterless computer is discussed below but need not be discussed in the discussion of the basic principles of the present invention. The code space contains the programmed instructions of the parameterless computer and the data space contains the data to be operated on by the parameterless computer.

There is no linear addressing of either the instructions in the code space or the data in the data space. All instructions and data are accessed relationally. This means, for example, that in the case of the code space, a particular instruction is accessed not by decoding its address but by accessing the instruction through its proximal relationship to other, previously executed code. "Accessing" an instruction or a data bit, as used hereinbelow, means moving the respective code or data pointer to the location in the code/data space of the instruction or the data bit.

The data pointer in a parameterless computer identifies a single data bit at any given time. A particular data bit is not linearly addressed, as in present computers, but rather is uniquely identified by its proximal location relative to the current location of the data pointer. The code pointer identifies a single instruction word at any given time. An instruction is one word that will vary in length for different parameterless computers, as described below, depending on the dimensions and tiling of the code for a given parameterless computer.

Table 1 lists the complete instruction set for a two-dimensional, square tiled parameterless computer according to the methods and apparatus of the present invention.

TABLE 1

| Instruction | Operates to... |
|---|---|
| RC | Rotate the code pointer counterclockwise. |
| RD | Rotate the data pointer counterclockwise. |
| INC | Increment the data pointer in the current data direction. |
| INV | Invert the data bit at the current data pointer location. |
| SZ | Skip the next instruction in the current code direction if the current data bit is 0. |
| SKP | Unconditionally skip to the next instruction in the current code direction. |
| NOP | No operation |

In actual parameterless computers, each instruction is represented by a unique digital value. The above instruction labels are used herein below in place of the actual bit representations to aid in the clarity of the description.

Instruction "RC" operates to rotate the code pointer counterclockwise and move the code pointer one position in the new direction. Each RC instruction rotates the code pointer 90° thus four consecutive RC instructions cause the code pointer to make one full 360° revolution, as described in more detail with respect to FIGS. 1–3. Instruction "RD" rotates the data pointer 90° counterclockwise. Instruction "INC" increments or "moves" the data pointer in the current direction of the data pointer. In the two-dimensional example, if the data pointer is currently pointing in the "left" direction, the INC instruction will cause the data pointer to move one bit to the left in the data space. Instruction "INV" causes the data bit at the current location of the data pointer to invert from a zero to a one or vice versa. Instruction "SZ" operates to skip the next instruction in the current direction of the code pointer if the current data bit identified by the data pointer has a zero value. Instruction "SKP" is an unconditional skip of the next instruction in the current code pointer direction. Instruction NOP does not change the state of the code space or the data space. NOP instructions are used to link threads of code together in the code space.

There are variations and supplementations of the above instruction set that are discussed below for other embodiments of the present invention but the instruction set of Table 1 provides a foundation for demonstration of the present invention. Also, as noted above, the dimensions and tiling for a given space determine in part the operation of the instruction set. For example, each RD ("rotate data pointer") or RC ("rotate code pointer") instruction in a two-dimensional, triangular tiled code/data space implementation will rotate the respective pointer 120° rather than 90°. Three RC instructions will therefore cause the code pointer to make one full 360° revolution in a two-dimensional, triangular tiled code/data space implementation of the present invention.

Methods of Parameterless Computer: In General—FIG. 8

Figure 8:
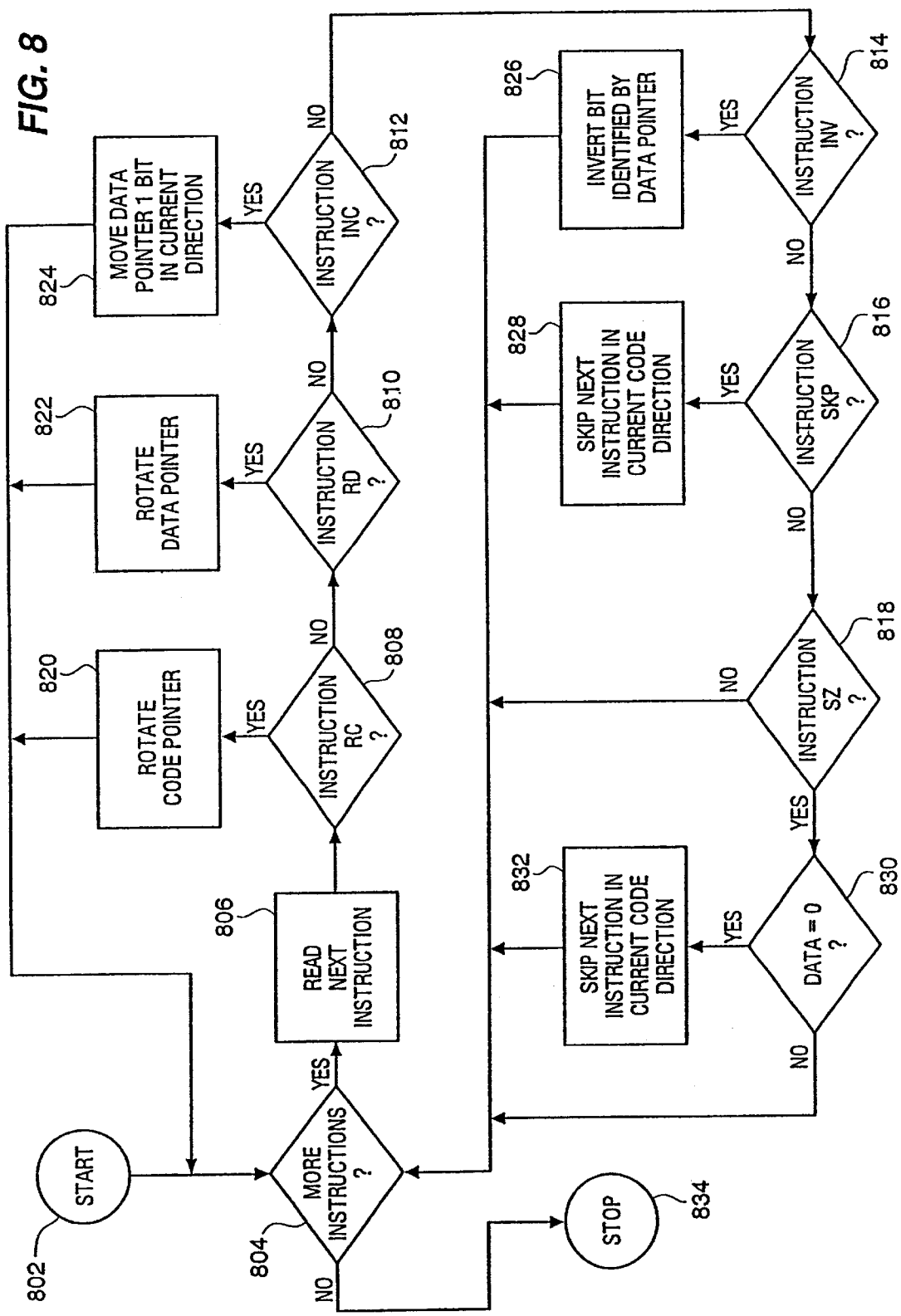
FIG. 8 is a flow diagram of the methods of the present invention.

FIG. 8 is a flow chart illustrating the methods of the present invention for operating a parameterless computer as shown in block diagram form in FIG. 5. Operation of the parameterless computer starts with element 802 of FIG. 8. In decision block 804 it is determined if there are any more instructions to be executed. If there are no more instructions to be executed then processing proceeds to element 834 where operation of the parameterless computer stops. If there are further instructions to be executed then processing continues to step 806. In step 806, the next instruction is read in the code space. With reference to FIG. 5, the next instruction is read over path 511 from code/data space 510 to PCU 520. Processing then continues to decision block 808.

Decision blocks 808–818 determine the type of the current instruction. Processing continues from decision block 808 through decision block 818 until the current instruction type is identified at which point processing branches to one of steps 820–830, respectively. Steps 820–830 initiate or complete the operation of the various instructions. Decision block 808 determines if the current instruction is an RC instruction. If the current instruction is not an RC instruction then processing continues to decision block 810. If the current instruction is an RC instruction then processing continues to step 820. Step 820 operates to rotate the code pointer, as described above. Processing continues from step 820 to decision block 804 to begin the processing of the next instruction in the new code pointer direction.

Decision block 810 operates to determine if the current instruction is an RD instruction. If the current instruction is not an RD instruction then processing continues to decision block 812 else processing continues to step 822. Step 822 operates to rotate the data pointer after which processing returns from step 822 to decision block 804.

Decision block 812 determines if the current instruction is an INC instruction. If the current instruction is not an INC instruction then processing continues to decision block 814 else processing continues to step 824. Step 824 operates to move the data pointer one bit in the current direction of the data pointer. Processing returns from step 824 to decision block 804 to begin processing the next instruction.

Decision block 814 determines if the current instruction is an INV instruction. If the current instruction is not an INV instruction then processing continues to decision block 816 else processing continues to step 826. Step 826 operates to invert the bit that is currently identified by the data pointer. Processing returns from step 826 to decision block 804 to begin processing the next instruction.

Decision block 816 determines if the current instruction is a SKP instruction. If the current instruction is not a SKP instruction then processing continues to decision block 818 else processing continues to step 828. Step 828 operates to SKP the next instruction in the current direction of the code pointer. Processing returns from step 828 to decision block 804 to begin processing the next instruction.

Decision block 818 determines if the current instruction is an SZ instruction. If the current instruction is not an SZ instruction then processing returns from decision block 818 to decision block 804 to begin processing the next instruction. The SZ instruction is the last of the six possible instructions to be processed in this flow diagram example of FIG. 8. Therefore, if processing proceeds to decision block 818 and the current instruction is not an SZ instruction it means that the current instruction is a "no operation" or a NOP and processing returns to decision block 804 for the next instruction. If the current instruction is an SZ instruction processing proceeds to decision block 830.

Decision block 830 determines if the current data bit identified by the data pointer has a value of zero or one. If the current data bit identified by the data pointer has a value of one it means the next instruction should not be skipped and processing turns to decision block 804 to begin processing the next instruction. If the current data bit identified by the data pointer has a value of zero then processing continues to step 832. Step 832 operates to skip the next instruction in the current direction of the code pointer. Processing then continues to decision block 804 to begin processing the next instruction.

Exemplary Parameterless Computer Program—FIGS. 1–3

FIG. 1 is a schematic representation of a set of instructions arranged in a code space 100 according to the methods of the present invention. The pointer direction component of the parameterless computer state requires that a full description of a parameterless computer program include at least a schematic representation of the code and data spaces. Code space 100 is a square-tiled, two-dimensional array in which instruction locations are defined by columns 101–106 and rows 107–125. Vector 126 indicates the initial position and direction of the code pointer. Code space 100 is implemented in any kind of storage device such as, but not limited to, a Programmable Read-Only Memory ("PROM"). Each location in code space 100 represents a data byte of, in the current two-dimensional square tiled example, 4 bits. A two-dimensional, square tiled data space 200 is illustrated in FIG. 2. Bit locations in data space 200 are defined by columns 201–205 and rows 206–207. Vector 209 indicates the initial position and direction of the data pointer. Data space 200 is implemented in any type of storage device such as, but not limited to, a Random Access Memory ("RAM") or gate array in which data can be modified.

In the current example, the code pointer does not "wrap around" when it exceeds the edge of code space 100. Therefore, code space 100 can be viewed as an infinitely large two-dimensional array where only the instructions of interest in this limited example are shown in FIG. 1. In another embodiment of the present invention, the code pointer is allowed to "wrap around". Therefore in this alternative embodiment code space 100 can be viewed as a closed surface such as a cylinder if the code pointer can wrap off the left and right sides but not the top and bottom of code space 100. Although discussed with respect to code space 100, the same alternative surfaces are applicable to data space 200.

The instructions in code space 100 represent a program that operates as a bit incrementer to successively increment the value of number 208. Columns 202–204 of row 206 represent the data bits of number 208. Columns 202–204 of row 207 contain guard bits used by the methods of the present invention to determine the bit length of number 208. In the example illustrated in data space 200, number 208 has an initial binary value of 010.

A partial execution of the instructions in code space 100 is summarized in FIG. 3. The summary of FIG. 3 is provided in terms of the respective positions and directions of the code pointer and the data pointer. Each row of the code pointer column summarizes the status of the code pointer for a given point in the execution of the instructions in code space 100. The term "code pointer" does not refer to a physical device or event. Rather, the code pointer status defines the state of code execution of the parameterless computer of the present invention. Each row of the data pointer column summarizes the status of the data pointer for a given point in the execution of the instructions in code space 100. The term "data pointer" does not refer to a physical device or event. The data pointer status identifies a particular data bit and the direction the data pointer will move with the next INC instruction. The 'data pointer' column of FIG. 3 also includes the bit value of the currently identified bit in those steps where the current bit value determines or is relevant to the program flow. With each clock, the parameterless computer executes the instruction pointed to by the code pointer. For example, in the initial state, the first clock causes the execution of the RD instruction at "107/101: D" as indicated in row 301 of FIG. 3. This changes the state of the computer to that summarized in row 302 of FIG. 3. The "apply instruction" column of FIG. 3 indicates the instruction pointed to by the code pointer.

In the example of FIGS. 1–3, code execution begins with the code pointer at row 107 and column 101 moving in the "down" direction, as indicated by vector 126. This initial condition of the code pointer is summarized in line 301 of FIG. 3 as "107/101: D". The format used in FIG. 3 to summarize the status of the pointers is "ROW/COLUMN: DIRECTION". Likewise, the starting position of the data pointer is summarized in FIG. 3, line 301 as "206/204: R" meaning that the data pointer is at row 206, column 204 and is pointed in the "right" direction, as indicated by vector 209 of FIG. 2. The code and data pointers could be initialized at any position and direction within the respective code and data spaces.

The instructions in code space 100 represent a parameterless computer program. The parameterless computer program represented in code space 100 operates to increment number 208 in data space 200. Program execution begins with the RD instruction at row 107, column 101. The RD instruction of row 107, column 101 operates to rotate the data pointer counterclockwise. The resulting position and direction of the data pointer after the execution of this first instruction is summarized in line 302 of FIG. 3 as "206/204:U". The data pointer is at the same bit location in the data space but the direction is now "up" since the pointer has been rotated 90° counterclockwise. The next two instructions, rows 108–109, column 101 are also RD instructions whose execution results in the data pointer status summarized in line 304 of FIG. 3. The data pointer is at row 206, column 204 and is pointed "down" and the code pointer is located at row 110, column 101 and is also pointed down. Execution of the INC instruction at row 110, column 101 causes the data pointer to move one bit forward in the current data pointer direction, as summarized in line 305, "data pointer" column of FIG. 3 as "207/204:D". The data pointer is then rotated again, by the operation of the RD instruction at row 111, column 101 so that the data pointer is pointed to the right at row 207, column 204. This first set of instructions, rows 107–112, column 101, operate to move the data pointer into the guard bits, row 207, so that the right-most bit in number 208 can be located.

A SKP instruction causes the code pointer to unconditionally skip the next instruction in the direction of the code pointer. Two SKP instructions, row 112, column 101 and row 114, column 101, operate to bring the code pointer to row 116, column 101. The code pointer and data pointer positions at this point in the code execution are summarized in line 308 of FIG. 3.

The SZ instruction operates to skip the next instruction in the direction of the code pointer if the current data bit identified by the data pointer is zero. In this example, the code operates to move the data pointer along the guard bits to the right until a zero is encountered signifying the location of the right most, i.e., least significant, data bit. At this point in the code execution, the data pointer is at row 207, column 204 which contains a data bit having a value of 1. Since the data bit is not a zero, code execution does not skip the next instruction. Therefore, the code execution continues to row 117, column 101 and the first RC instruction.

The RC instruction rotates the code pointer counterclockwise, in this case, from "down" to "right". Code execution next moves to the right to row 117, column 102 and another RC instruction which rotates the code pointer from "right" to "up". The next instruction (row 116, column 102) is an INC instruction which moves the data pointer in its current direction to the right. Code execution is brought back around to column 101 to check for the end of the guard bits by the next two RC instructions at row 115, column 102 and column 101. This loop of code defined by an array in code space 100 having an upper left-most corner at row 115, column 101 and a lower right-most corner at row 117, column 102 iterates until the right-most guard bit is identified by a 0 bit in row 207. The pointer positions are now summarized in line 314 of FIG. 3 and the SZ instruction is again executed. This time the data pointer is located at a 0 bit (row 207, column 205) thus code execution skips to row 118, column 101 where, responsive to the SKP instruction, code execution skips to row 120, column 101. Current pointer position summary is provided in line 316 of FIG. 3.

Now that the right-most data bit of number 208 is located, the code operates to rotate the data pointer, move the data pointer to the right most bit of number 208 and invert the right-most bit of number 208. The next three instructions of RD, INC, RD at rows 120–122 of column 101, operate to turn the data pointer from "right" to "up", move the data pointer to the row of number 208 and rotate the data pointer to "left". The INC instruction at row 123, column 101 moves the data pointer over the right-most (least significant) bit of number 208. Current pointer position summary is provided in line 320 of FIG. 3. The next instruction is INV which operates to invert the currently identified data bit. In this example the current data bit is a 0 so the INV instruction changes the bit to a 1. The bit inversion is indicated by the parenthetical bit values in rows 320–321 of FIG. 3. The partial execution of the program which is summarized in FIG. 3 illustrates the operation of the entire instruction set provided in Table 1 for the parameterless computer of the present invention.

Operation of the remaining code is consistent with the description of the operation of the instruction set already provided with respect to FIGS. 1–3. The remaining code branches deal with the "carry" and "no carry" cases of the bit increment. In the current example, the least significant bit of number 208 at row 206, column 204 has been inverted from a 0 to a 1. Thus, a "carry" is not necessary to complete the increment of number 208. The SZ instruction at row 125, column 103 causes program execution to branch into either branch A, the "no-carry" branch, or branch B, the "carry" branch. A detailed description of the execution of the individual instructions of these branches would be repetitive as the operation of the entire instruction set has been explained above. One can step through the remaining instructions to view the complete and continuing operation of the bit incrementer given the above description of the parameterless computer instruction set.

As noted above, there are no operands associated with instructions in the programming language of the present invention. A result of this is that reuse of code is far simpler and more effective than in current programming languages. In addition to iterating over a "loop" of code, for example, one might use a piece of code in one direction for a first operation and use the same piece of code in a different direction for a second operation. A limited example of this is found at row 119, column 104 of code space 100. The INC instruction at this location is accessed in different directions by two different "threads" of code. In this example of a two-dimensional, square-tiled parameterless computer, each single instruction can be accessed from the four possible directions by different threads of code in a code space. Given the relatively small instruction set and the elimination of operands, the possibilities for code reuse are greatly increased as compared to existing computers. A code space of 3 or more dimensions provides even increased opportunity for code reuse. For example, in a three-dimensional, cube-tiled parameterless computer each instruction can be accessed from the six possible directions by different threads of code execution.

Figure 6:
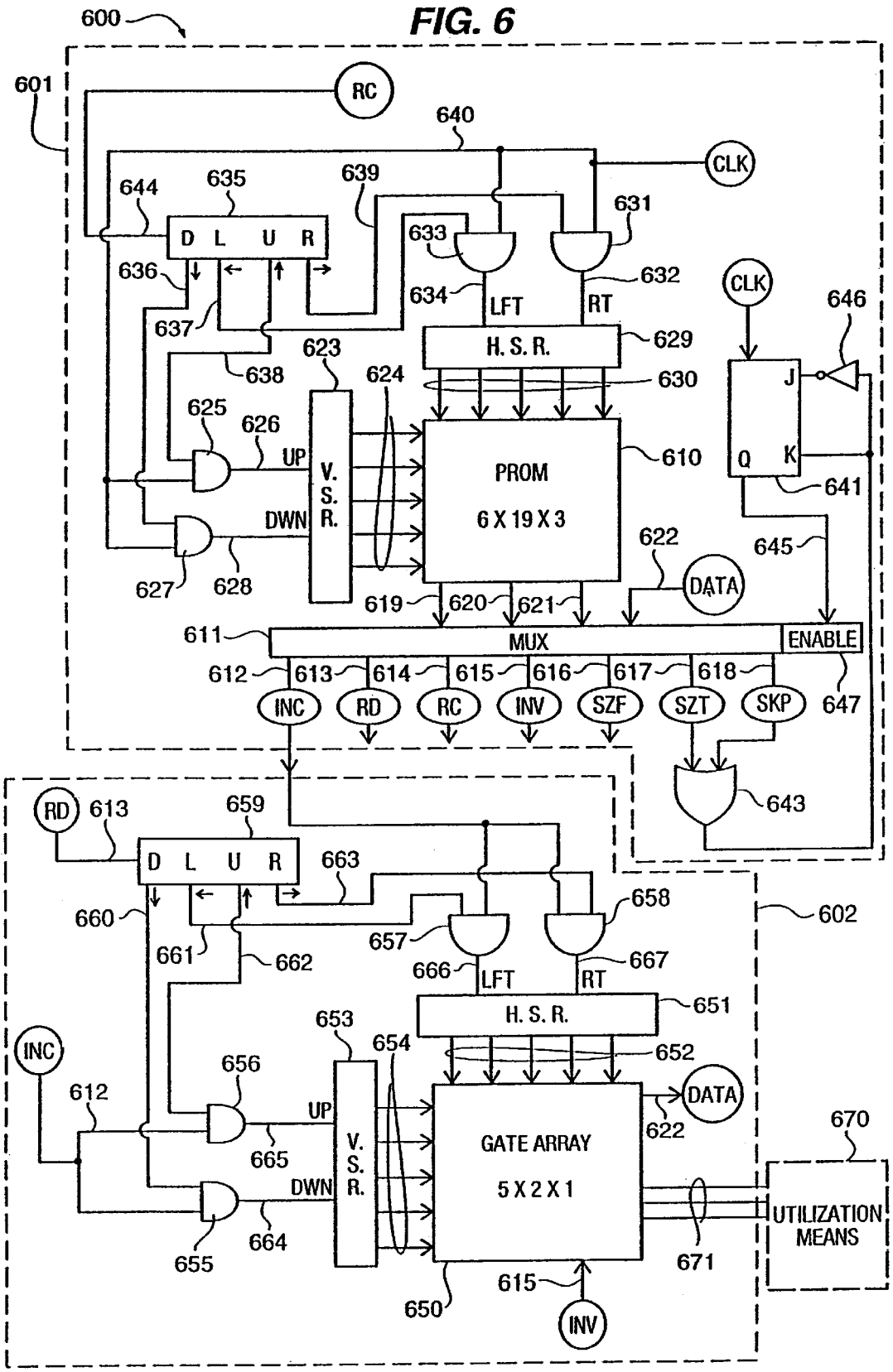
FIG. 6 is a schematic of a parameterless computer of the present invention.

Exemplary Parameterless Computer Hardware—FIG. 6

Operation of the exemplary parameterless computer of FIGS. 1–3 can be modeled on existing computers. However, using existing computer hardware to implement the parameterless programming language of the present invention fails to take advantage of many of the characteristics of the present invention. As with RISC computers described above, specialized hardware is used to optimally take advantage of the characteristics of the parameterless language of the present invention.

FIG. 6 illustrates an embodiment of a parameterless computer 600 of the present invention for implementation of the bit incrementer described with respect to FIGS. 1–3. As noted above, with an understanding of the parameterless programming language of the present invention, those skilled in the art can implement any number of complementary hardware schemes. Computer 600, described below, is just one of the possible embodiments. Computer 600 is comprised of code section 601 and data section 602. Operation of computer 600 is first described with respect to code section 601.

Code section 601 contains the code space and the related code pointer processing circuitry. PROM 610 is the code space for parameterless computer 600 and corresponds to a portion of code/data space 510 in the block diagram of FIG. 5. PROM 610 has a memory size of at least 6×19×3 in order to hold the grid of instructions shown in FIG. 1. The remaining circuitry of code section 601, corresponding to PCU 520 in the block diagram of FIG. 5, operates as described below to process each instruction. The least significant bit input of 1 of 16 decoder 611 is the "DATA" signal received over path 622 from data section 602. The "DATA" signal over path 622 is determined by the value, 0 or 1, of the data bit currently identified by the data pointer. Generation of the "DATA" signal is described more fully below. 1 of 16 decoder is enabled by a logical high signal at the enable input 645.

Decoder 611 has outputs 612–618, only one of which is enabled at any given time. Each of decoder outputs 612–618 represents one instruction of the instruction set shown in Table 1, above. There are seven outputs for the six operational instructions of the instruction set. The one conditional instruction, SZ ("skip if zero"), requires two outputs, SZT (true; currently identified data bit is zero) over path 617 and SZF (false; currently identified data bit is not zero) over path 616. All other instructions behave the same regardless of the "data" signal. The NOP instruction does not initiate any actions in parameterless computer 600 thus there is no signal representing the NOP instruction.

FIG. 7 is a table illustrating the bit values input to decoder 611 over paths 619–622 in response to selection by the code pointer of the various instructions in the code space of PROM 610. Column 701 of table 700 shows the data-byte associated with each instruction. The four binary digits of each byte in column 701 correspond to the signals transmitted over paths 619–622, respectively. The fourth or least significant digit is shown as an "X" in some of rows 703–709 indicating that the bit value does not matter for the given instruction. The least significant bit, the value of which is transmitted over path 622 as the "DATA" signal, is only of relevance for the SZ instruction and is therefore only shown as a particular value in rows 708–709 of table 700. The signals received over paths 619–622 are decoded, as described above, to enable the one output of decoder 611 corresponding to the current instruction.

The code pointer is navigated through the code space of PROM 610 by the manipulation of horizontal shift register 629 and vertical shift register 623. The outputs 630 of horizontal shift register 629 and the outputs 624 of vertical shift register 623 combine to select one instruction byte at a time from PROM 610. The output of each of horizontal shift register 629 and vertical shift register 623 is determined by two AND gates for each shift register, the outputs of which are input to the shift registers. AND gates 633 and 631 control the operation of horizontal shift register 629. Each signal over path 634 from AND gate 633 causes horizontal shift register 629 to shift left. Each signal over path 632 from AND gate 631 causes the horizontal shift register 629 to shift right. Each of AND gates 631 and 633 have two inputs which determine their respective AND gate output. Clock signal over path 640, is common to each of AND gates 631 and 633. Thus one input to AND gates 633 and 631 is the system clock signal. The other input to each of AND gates 633 and 631 is a "pointer direction" signal over path 637 or path 639, respectively.

The "pointer direction" signals over paths 636–639 are generated by Code Shift Register ("CSR") 635. Each of the four CSR outputs, 'D', 'L', 'U', 'R' represents one of the four possible directions of the code pointer. Each time an RC instruction is processed, the enabled output of CSR 635 shifts to the left. Thus, if output 'R' of CSR 635 is enabled and an RC instruction is produced at the output of decoder 611, a signal is transmitted over path 614 to control input 644 of CSR 635. The RC signal at control input 644 causes CSR 635 to shift its enabled output one position to the left, namely to output 'U' in this example. This effectively rotates the code pointer counterclockwise 90° by changing the code pointer's direction from "right" to "up". Each successive signal over path 614 generated with each successive RC instruction causes the code pointer to rotate counterclockwise 90° through the shifting of the enabled output of CSR 635.

Output 'L' of CSR 635, representing a code pointer direction of "left", is connected to an input of AND gate 633 over path 637. Therefore when output 'L' of CSR 635 is enabled, meaning the code pointer is pointed left, and a clock pulse is received over path 640, the code pointer moves one byte or word to the left in the code space. Specifically, enabling output 'L' of CSR 635 causes, at the event of the next system clock pulse, a logical high input to AND gate 633 on both inputs and therefore a logical high output from AND gate 633. As noted above, a signal from AND gate 633 causes horizontal shift register 629 to shift left. Shifting horizontal shift register 629 left causes the selection of an instruction byte located to the left of the last-selected instruction byte. This is summarized by stating that the code pointer has moved one instruction to the left. Output 'R' of CSR 635, representing a code pointer direction of "right", is connected over path 639 to an input of AND gate 631. Therefore when output 'R' of CSR 635 is enabled, meaning the code pointer is pointed to the right, and a clock pulse is received over path 640, the code pointer moves one instruction to the right in the code space.

Control of vertical shift register 623 is achieved in similar fashion to that just described with respect to horizontal shift register 629. AND gates 627 and 625 provide the control input to vertical shift register 623. A pulsed output from AND gate 627 shifts the output of vertical shift register 623 down while a pulsed output from AND gate 625 shifts the vertical shift register 623 up. The system clock signal over path 640 is input to one of the two inputs of both AND gates 627 and 625. The other input to AND gates 627 and 625 is provided by the pointer direction signals over paths 636 and 638, respectively. Output 'D' of CSR 635, representing a code pointer direction of "down", is connected over path 636 to an input of AND gate 627. Likewise, output 'U', representing a code pointer direction of "up", is connected over path 638 to an input of AND gate 625 and causes the movement of the code pointer one instruction up in the code space.

Horizontal shift register 629 and vertical shift register 623 are thereby controlled to select the appropriate instruction stored in PROM 610. Outputs 630 of horizontal shift register 629 and outputs 624 of vertical shift register 623 are connected to row and column lines for PROM 610. Instructions or bytes in PROM 610 are selected with each clock cycle as described above and as each instruction is selected its binary value is output over lines 619–621. As noted above, decoder 611 utilizes the instruction binary values over paths 619–622 to generate the various instruction signals over paths 612–618.

Whereas the state of code section 601 changes with each clock cycle, the state of data section 602 changes only with the execution of certain instructions. In particular, it is only the RD, INC and INV instructions that result in a change of state in data section 602. Gate array 650 is a grid of at least 5×2×1 flip-flops and represents the data space of parameterless computer 600 illustrated in FIG. 2. The location of the data pointer is signified by the one enabled flip-flop in gate array 650. Which flip-flop is enabled is determined by the inputs to gate array 650 from horizontal shift register 651 and vertical shift register 653. One of outputs 652 and one of outputs 654 combine to select and enable one of the flip-flops of gate array 650.

One of outputs 652 from horizontal shift register 651 is enabled at a time. The enabled output is shifted to the left by a pulse from AND gate 657 and is shifted to the right by a pulse from AND gate 658. One of outputs 654 of vertical shift register is enabled at a time. The enabled output is shifted down by a pulse from AND gate 655 and is shifted up by a pulse from AND gate 656. A signal over path 612, generated by an INC instruction, operates to move the data pointer in the current direction of the data pointer. The INC signal is transmitted over path 612 to AND gates 655–658. As noted above, the other input signal for each of AND gates 655–658 is representative of the current direction of the data pointer.

The data pointer direction is determined in much the same way as the code pointer direction is determined. Data Shift Register ("DSR") 659 has outputs 'D', 'L', 'U', and 'R', each one of which represents a different direction of the data pointer. Each time an RD instruction is processed, the enabled output of DSR 659 shifts to the left. Thus, if output 'R' of DSR 659 is enabled and an RD instruction is produced at the output of decoder 611, a signal is transmitted over path 613 to control input 613 of DSR 659. The RD signal at control input 613 causes DSR 659 to shift its enabled output one position to the left, namely to output 'U' in this example. This effectively rotates the data pointer counterclockwise 90° by changing the data pointer's direction from "right" to "up". Each successive signal over path 613 generated with each successive RD instruction causes the data pointer to rotate counterclockwise 90° through the shifting of the enabled output of DSR 659.

Output 'D' of DSR 659, representing a data pointer direction of "down", is connected over path 660 to an input of AND gate 655. Output 662, representing a data pointer direction of "UP", is connected to an input of AND gate 656. Output 'L' of DSR 659, representing a data pointer direction of "left", is connected to an input of AND gate 657. Output 'R' of DSR 659, representing a data pointer direction of "right", is connected to an input of AND gate 658. If, for example, output 'D' of DSR 659 is enabled when an INC signal is received over path 612, then the output of AND gate 655 is pulsed. The pulsed output of AND gate 655 over path 664 to vertical shift register 653 results in the enabled one of outputs 654 to shift down one position. This results in the enabled one of the flip-flops making up gate array 650 to shift down one flip-flop. As noted, this is termed moving or navigating the data pointer down one data bit.

Each flip-flop in gate array 650 has a state of either 1 or 0. Outputs 671 from gate array 650 are used by utilization means 670. Utilization means 670 could be a display, another memory device, another section or segment of parameterless computer 600 that makes use of the incrementing bit output of parameterless code section 601 and data section 602, or any other device or system utilizing the data of gate array 650. For example, utilization means 670 could be a 7 segment LED display with outputs 671 from gate array 650 used to control the display.

Programmed Operation of Hardware—FIGS. 1–3, 6

Using the parameterless computer program example of FIGS. 1–3, the operation of parameterless computer 600 is more fully described. Referring to FIG. 1, the initial condition of the code pointer is at row 107, column 101 and in the down direction. The state of parameterless computer 600 reflects this initial condition. Output 'D' of CSR 635 is enabled so that the code pointer will move down of outputs 630 with each clock cycle. Horizontal shift register 629 is set to first column and vertical shift register 623 is set to first row of outputs 624 thereby initializing the code pointer in the upper left-hand corner of code space 100. The actual physical location of the initial, and subsequent, instructions or bytes within PROM 610 is not important. The two-dimensional grid of code space 100 is mapped into the memory of PROM 610. There are numerous techniques known to those skilled in the art for mapping of memory. The selection of any one of these techniques is sufficient and the specific memory mapping approach does not form part of the present invention. The initial conditions for data section 602 are determined by the state of outputs 654 of vertical shift register 653 and outputs 652 of horizontal shift register 651. These inputs to gate array 650 combine to select the flip-flop in the array corresponding to row 206, column 204 of date space 200 in FIG. 2. The initial direction of the data pointer is to the right therefore output 'R' of DSR 659 is enabled.

With the first clock over path 640, decoder 611 decodes the signals over paths 619–622 to enable the RD signal over path 613. The RD signal over path 613 pulses control input 613 of DSR 659 causing the enabled output of DSR 659 to shift from output 'R' (the initial condition) to output 'U'.

The code pointer is moved down one instruction by the same initial clock pulse. Output 'D' of CSR 635 is enabled so when the clock signal pulses AND gate 627, a pulse on the output of AND gate 627 over path 628 causes vertical shift register 623 to shift down. This selects the next instruction in code space 100 implemented in PROM 610. The summary of program execution after the first clock cycle is provided in line 302 of FIG. 3.

The next two clock cycles execute further RD instructions and operation of parameterless computer 600 is as described above for execution of the first RD instruction. The present program state is summarized by line 304 of FIG. 3. The fourth clock cycle initiates the execution of the INC instruction at row 110, column 101 of code space 100. The current data pointer direction is down meaning output 'D' of DSR 659 is enabled. The INC signal over path 612 to AND gate 655 creating a pulse on path 664 to the down-control input of vertical shift register 653. This changes the enabled flip-flop in gate array 650 from the initially enabled flip-flop to the flip-flop one position below the initially enabled flip-flop. The present program execution is summarized in line 305 of FIG. 3.

The remaining steps of the program described with respect to FIGS. 1–3 are executed by parameterless computer 600 in similar fashion to that described with respect to the initial RD and INC instructions. A SKP instruction or a SZT instruction results in a logical high output from OR gate 643. A logical high output from OR gate 643 raises K (of J-K flip flop 641) and, through operation of inverter 646, lowers J of J-K flip flop 641. On the next clock pulse output Q of flip flop 641 goes low pulling the enable 647 on decoder 611 low. Thus what would be the next instruction, but for the SKP or SZT instruction, has no effect. After a skipped instruction, K of J-K flip flop 641, is once again low (and J high) and on the next clock pulse Q, of J-K flip flop, goes high and instructions once again have effect. An RC instruction causes a signal over line 614 to the shift control input of CSR 635. This shifts the enabled output of CSR 635 one position to the left or, if the 'D' output of CSR 635 is presently enabled, from the 'D' output to the 'R' output. An INV instruction results in a signal over line 615 to the 'STATE' input of gate array 650 causing the inversion of the state of the currently enabled flip-flop of gate array 650. If the presently enabled flip flop of gate array 650 has a state of logical 1 then an INV instruction will change the state of the presently enabled flip-flop to a logical 0, and vice versa.

Multiple Pointers

In a further embodiment of the parameterless computer of the present invention, multiple data pointers are utilized. Multiple data pointers allow the developer of a parameterless computer the flexibility of modifying and utilizing "separate" data fields in the data space. Table two, below, lists the instruction set for a parameterless computer utilizing two data pointers.

TABLE 2

| Instruction | Operates to... |
| --- | --- |
| RC | Rotate the code pointer counterclockwise. |
| RD | Rotate the data pointer counterclockwise. |
| INC | Increment the data pointer in the current data direction. |
| INV | Invert the data bit at the current data pointer location. |
| SZ | Skip the next instruction in the current code direction if the current data bit is 0. |
| SKP | Unconditionally skip to the next instruction in the current code direction. |
| SZFDP | Unconditionally flip (switch) the data pointer and skip the next instruction in the current code direction if the current data bit is 0. |

The only difference between the instruction set of Table 2 and the instruction set of Table 1 is the SZFDP ("Skip Zero and Flip Data Pointer") instruction. Two data pointers are operated independently from one another using this instruction. The SZFDP instruction is used to toggle between the two pointers.

Three or More Dimensions

As noted above, the methods of operation of the parameterless computer of the present invention applies equally to parameterless computers of 'n' dimensions. The only change to the instruction set is to allow for the navigation of the code and data pointers in the full range of motion possible in the code and data spaces. The effect of the RC and RD commands is modified to cycle the pointers through all the degrees of freedom in any specific order. As noted above, in a two-dimensional, square-tiled parameterless computer the pointers rotate as follows: up, left, down, right. Alternatively, the pointers could rotate as follows: up, down, left, right. As long as the pointers cycle through all degrees of freedom in a specific order, any rotation order is acceptable. In the example of a three-dimensional, cubic-tiled parameterless computer, the pointers can rotate as follows: up, forward, left, down, back, right. Of course, any other specific order can also be used. Those skilled in the art recognize that any specific rotation order that moves a pointer through all available degrees of freedom is acceptable. One can also use a certain rotation order for the data pointer and a different, but certain, rotation order for the code pointer. It is also possible to use multiple pointer control commands to control the orientation of each pointer. For example, in a three-dimensional, cubic-tiled parameterless computer one could use a first pointer control instruction to orient a pointer using the "up, left, down, right" rotation order. This would rotate the pointer to move within a given plane of the data or code space. A second pointer control instruction is used to orient pointer to move, with the next INC instruction, to a different plane within the code or data space. Again, any combination that allows a pointer to move through all the possible degrees of freedom is acceptable and equivalent in operation.

Tiling of Code and Data Space

As noted above, the code space and the data space are characterized by a dimension characteristic and a tiling characteristic. The combination of the dimensions and tiling of a space (code or data) determines the specific instructions necessary to navigate the code and data pointers. For example, in a three-dimensional code space using cubic tiles, each cube, i.e., each instruction in the code space, can be accessed from six different directions. Therefore, the instruction set includes instructions for moving the code pointer through the code space in any of six different directions.

The dimensions and tiling also determines the number of bits making up an instruction word in code space. The instruction word length is typically determined by counting the number of vertices in the tile shape of a given space. Three dimensional, cubic tiles have 8 vertices and therefore are typically populated by 8 bit words. Two dimensional, triangular tiles have three vertices and therefore are typically populated by 3 bit words. The nexus between dimension, tiling and word length is a result of the necessary proximal relationship between neighboring instruction words. Each instruction has a family of neighboring instructions to which program execution can continue on the next instruction. The direction of the code pointer determines which of those neighboring instructions will next be executed. Thus, the instruction words should be stored in a shape approximating the tiling to facilitate the movement of the pointer from a present instruction word to a next adjoining instruction word.

There are combinations of dimension and tiling that allow for instruction word bit lengths which differ from the above rule. The parameterless computer, for example, described with respect to FIGS. 1–3 and 6 is implemented with 3 bit instruction words rather than 4 bit instruction words since the square tiling allows for the proximal relationship between neighboring instructions to be maintained.

Alternative Hardware Embodiments

As noted with respect to FIG. 6, the general principle of a parameterless computer can be implemented in any number of ways. An optimized parameterless computer can use hardware components specifically designed to leverage the advantages of the parameterless programming language. For example, an array of "data blocks" can be produced wherein each data block is capable of passing the "enable" to its neighboring data blocks depending on the data pointer status. The data blocks would all share common data pointer status control inputs and INC instruction and INV instruction inputs. Only the enabled data block, for example, would be effected by an INV instruction. An INC instruction passes the enable from one data block to the appropriate adjacent data block.

It is to be expressly understood that the claimed invention is not to be limited to the description of the preferred embodiment but encompasses other modifications and alterations within the scope and spirit of the inventive concept.

We claim:

1. A parameterless computer program embodied in a computer readable medium comprising:

a code space having multiple dimensions and being segregated to define distinct locations;

multiple instructions positioned in corresponding locations of the code space; and a code pointer to reference a location in the code space, the code pointer having a position within the code space, the position identifying a current instruction in a current location.

2. The parameterless computer program of claim 1, wherein the code pointer further includes a direction within the code space, the direction identifying a next instruction in a next location.

3. The parameterless computer program of claim 1, wherein the instructions include an instruction to change at least one of the position or the direction of the code pointer.

4. The parameterless computer program of claim 1, wherein the instructions include a rotate code instruction to rotate the code pointer.

5. The parameterless computer program of claim 1, wherein the instructions include a skip instruction for the code pointer to skip a location in the code space.

6. The parameterless computer program of claim 1, further comprising:

a data space having multiple dimensions and being segregated to define distinct locations; and a data value having multiple bits, the bits being positioned in corresponding locations of the data space.

7. A parameterless computer program of claim 6, further comprising a data pointer to reference a location in the data space.

8. A parameterless computer program of claim 7, wherein the data pointer has a position and a direction within the data space, the position identifying a current bit in a current location and the direction identifying a next bit in a next location.

* * * * *

UNITED STATES PATENT AND TRADEMARK OFFICE
CERTIFICATE OF CORRECTION

PATENT NO. : 6,230,264 B1
DATED : May 8, 2001
INVENTOR(S) : Kenieth Robert Peery et al.

Page 1 of 1

It is certified that error appears in the above-identified patent and that said Letters Patent is hereby corrected as shown below:

<u>Title page, Item [54], Column 1, line 1,</u>
Change "PARAMETERLESS LANGUAGE IN A MACHINE FOR IMPLEMENTATION THEREOF" to -- PARAMETERLESS COMPUTER LANGUAGE --

Signed and Sealed this

Nineteenth Day of February, 2002

*Attest:*

JAMES E. ROGAN
*Attesting Officer*  *Director of the United States Patent and Trademark Office*